United States Patent [19]

Andon et al.

[11] Patent Number: 5,108,761
[45] Date of Patent: Apr. 28, 1992

[54] METHOD OF PREVENTING TOOTH ENAMEL EROSION UTILIZING AN ACIDIC BEVERAGE CONTAINING CALCIUM

[75] Inventors: Mark B. Andon, Fairfield; Robert L. Kanerva, Cincinnati; John T. Rotruck, Oxford; Kenneth T. Smith, Cincinnati, all of Ohio

[73] Assignee: The Procter & Gamble Company, Cincinnati, Ohio

[21] Appl. No.: 590,983

[22] Filed: Oct. 1, 1990

[51] Int. Cl.$^5$ ................................ A23L 2/02
[52] U.S. Cl. .................... 426/2; 426/74; 426/599; 424/49; 562/582; 562/584
[58] Field of Search ............. 426/74, 2, 599; 562/582, 584; 424/49

[56] References Cited

U.S. PATENT DOCUMENTS

| | | | |
|---|---|---|---|
| 3,968,263 | 7/1976 | Reussner | 426/250 |
| 4,786,510 | 11/1988 | Nakel | 426/599 |
| 4,786,518 | 11/1988 | Nakel | 426/590 |
| 4,992,282 | 2/1991 | Mehansho | 426/74 |
| 4,994,283 | 2/1991 | Mehansho | 426/74 |

FOREIGN PATENT DOCUMENTS 9005713 5/1990 PCT Int'l Appl. ............. 562/584

*Primary Examiner*—Carolyn Paden
*Attorney, Agent, or Firm*—Rose Ann Dabek; Jerry J. Yetter; Richard C. Witte

[57] ABSTRACT

Acidic beverages, e.g. juices and carbonated beverages containing calcium citrate malate are disclosed. These beverages inhibit the erosion of tooth enamel that normally occurs during consumption of acidic beverages. A nutritional regimen of administering an acid beverage (pH below 5.5) containing from 35 mg to 270 mg calcium per 6 ounce (180 ml) serving (0.02% to 0.15% w/v of calcium) in the form of calcium citrate malate, for preventing tooth enamel erosion is disclosed. This beverage comprises water, sweetener and flavor or juice.

12 Claims, No Drawings

METHOD OF PREVENTING TOOTH ENAMEL EROSION UTILIZING AN ACIDIC BEVERAGE CONTAINING CALCIUM

TECHNICAL FIELD

The present invention relates to nutritional and healthful improvements in acidic beverages. When these beverages are supplemented with calcium and specific molar ratios of malic and citric acids, the beverages inhibit the erosion of tooth enamel caused by contact with the acid.

BACKGROUND OF THE INVENTION

Commonly preferred sources of vitamin C include orange Juice and other citrus products, in particular, lemons. However, it has been recognized for a long time that these juices, due to their high acid content, can erode or etch the tooth enamel.

Citrus juices are not alone in this effect. Nectars, fruit punches, carbonated soft drinks, including colas and other fruit flavored drinks also have this effect on tooth enamel. In fact, any beverage with a pH of less than 5.5 has this effect. These beverages, aside from their sugar content, are becoming increasingly popular among all ages of consumers and are replacing coffee and tea as the most popular beverage products. There has been a desire, especially on the part of dentists to lessen the intake of these acid beverages which can cause this erosion.

Calcium is the fifth most abundant element in the human body and is a key ingredient in tooth enamel. Not surprisingly, nutritional and metabolic deficiencies of calcium can have broad-ranging adverse effects. The dissolution of the enamel affects the ability of the tooth to replenish its enamel. In addition, the enamel erosion caused by the acid contained in fruit juices and other beverages can lead to an undesirable appearance of teeth and the need for dental care due to significant attrition of the teeth and development of caries.

Surprisingly it has been discovered that by adding certain acids along with calcium to acidic beverages a positive effect on the tooth enamel is achieved. This combination of calcium with citric and malic acids (calcium citrate malate) is a soluble complex which prevents the erosion of tooth enamel.

Therefore, it is an object of this invention to provide a therapeutic regimen whereby the erosion of tooth enamel caused by consumption of acidic beverages is prevented. This therapeutic regimen consists of the addition of from about 0.02% to about 0.15% (w/v) of calcium as calcium citrate malate to the acid beverage.

These and other objects are secured herein, as will be seen from the following disclosure.

BACKGROUND ART

U.S. Pat. No. 3,949,098 issued Bangert (assigned Nabisco, 1976) describes a nutritious orange drink concentrate that contains whey protein. The patent suggests the addition of minor amounts of vitamins and other nutrients which include various cupric salts, manganese salts, zinc salts, as well as calcium salts.

"Nutrients and Nutrition of Citrus Fruits," *Citrus Nutrition and Ouality*. Ting, (American Chemical Society, 1980) discloses the presence of certain trace minerals in orange juice. Calcium and magnesium are the two major divalent cations in orange juice. The levels of all the minerals are low.

U.S. Pat. No. 4,551,342 (Nakel and Heckert) claims a composition for preparing a liquid beverage having a pH of 2½ to 6½ which comprises: a) a flavor component; b) a cation component comprising calcium, magnesium and potassium in very specific ratios; c) an edible acid component comprising specific ratios and amounts of citric, malic, phosphoric (and succinic) acids; and d) the cation and acid components being in amounts effective to impart body to the prepared liquid beverage.

U.S. 4,737,375 (Nakel, Russell, Dake and Heckert) claims a beverage substantially free of sugar alcohol which comprises: a) from 0.06 to 0.15% by weight calcium; b) from 0.24 to 1.05% by weight of an acid component selected from mixtures of citric, malic and phosphoric acids (specifically defined ratios); c) the weight ratio of acid to solubilized calcium being from 4 to 7; d) a flavor component which contains no more than 40% fruit juice by weight on a single strength basis; and an effective amount of the sweetener other than a sugar alcohol.

U.S. Pat. No. 4,722,847 (Heckert) claims a calcium supplemented single strength fruit Juice which is substantially free of added protein and which comprises: a) from 0.06 to 0.26 by weight solubilized calcium; b) from 0.4 to about 4% by weight of an acid component comprising a mixture of citric and malic acid in specific ratios; c) at least 45% fruit juice; d) a sugar content of 2° to 16° Brix and no more than 0.7% by weight chloride ion. This same patent also claims concentrates.

U.S. Pat. No. 4,830,862 (Braun, Dake and Tsai) claims a calcium supplemented beverage which comprises: a) from 0.05 to 0.15% by weight calcium; b) from 0.07 to 1% weight edible acid; c) from 0.2 to 0.14% by weight sulfate; d) from up to about 0.05% chloride; e) the amount of sulfate and chloride combined being up to 0.14% by weight; f) flavor; g) sweetener and h) water. This patent also claims concentrates.

An orange juice product containing calcium, citric and malic acid is commercially available in the United States.

SUMMARY OF THE INVENTION

The present invention provides methods for preventing erosion of tooth enamel in human or other animal subjects, consuming acidic (those having a pH of less than 5.5) beverages. This tooth erosion occurs in animals or humans of all ages and in all stages of tooth development. In babies under 1 year old the teeth are immature, i.e. the enamel is not fully formed. Ingestion of acidic beverages can delay the maturity process and hardening of this enamel in the baby's teeth. Ingestion of calcium in the form of calcium citrate malate in acidic beverages will prevent the deleterious effects of ingesting such acidic beverages on the maturing baby teeth.

The method comprises administering to said subjects a safe and effective amount of calcium citrate malate in the beverage. The calcium citrate malate comprises a complex or a mixture of calcium salts having a ratio of moles citrate to moles malate of from about 1:0.16 to about 1:13.5.

The ingestion of these beverages, by preventing tooth erosion, also prevents caries and mottling of teeth and therefore provides a cosmetic benefit.

All ratios, proportions and percentages herein are by weight, unless otherwise specified.

DETAILED DESCRIPTION OF THE INVENTION

The present invention relates to a nutritional regimen involving ingesting stable mineral supplements and supplemented beverages including dry beverage mixes which are effective in preventing the erosion of tooth enamel when they are consumed.

As used herein, the term "comprising" means various components can be conjointly employed in the method of the present invention. Accordingly, the terms "consisting essentially of" and "consisting of" are embodied in the term comprising.

As used herein, the term "flavors" includes both fruit and botanical flavors.

As used herein the term "sweeteners" includes sugars, for example, glucose, sucrose, and fructose. Sugars also include high fructose corn syrup, invert sugar, sugar alcohols, e.g. sorbitol, and mixtures thereof. Artificial sweeteners are also included in the term sweetener.

As used herein, the term "safe and effective amount" refers to the quantity of a component which is sufficient to yield a desired nutritional response without undue adverse side effects (such as toxicity, irritation, or allergic response) commensurate with a reasonable benefit/risk ratio.

In general, the amount of calcium will range from 35 mg to 270 mg per 6 ounce (180 ml) serving. It is difficult to add more than this to beverages without encountering precipitation and/or organoleptic problems. However, this level of supplementation is effective for the prevention of tooth enamel erosion and for taste and solubility in the acid beverages. This supplementation is from 0.02% to 0.15% (w/v) calcium in the form of a salt.

Calcium Citrate Malate Compositions

The methods of this invention involve administration of a mixture of calcium salts with citric and malic acids, herein "calcium citrate malate". The calcium citrate malate does not have a defined structure; it may consist of a mixture of calcium citrate and calcium malate, a complex of calcium containing citrate and malate ligands, a mixture of a calcium salt with citric acid and malic acid, or combinations thereof. Mixtures of calcium salts and citric and malic acids may be used to form calcium citrate malate in situ. in the beverage. Preferred are calcium citrate malate mixtures made by adding calcium carbonate, calcium hydroxide or other suitable source to a mixture of citric and malic acids. The citric acid and malic acid contents of the beverages are accounted for in the preparation of the calcium citrate malate.

The molar ratio of citrate:malate is from about 1:0.16 to about 1:13.5, preferably from about 1:0.5 to about 1:4.5, more preferably from about 1:0.75 to about 1:3. The ratio of total moles calcium:total moles citrate:total moles of malate is from about 2:1:1 to about 6:3:4, preferably from about 4:2:3 to about 6:3:4. The calcium citrate malate may contain other anions in addition to citrate and malate. Such anions may include, for example, carbonate, hydroxide, phosphate and mixtures thereof depending on the calcium source. A preferred calcium citrate malate for beverages is 4:2:3.

The calcium citrate malate can also be neutral, comprised entirely of citrate and malate anions. Thus, preferably, the equivalents of calcium ($2 \times$ moles calcium) is about equal to the total number of equivalents of citrate ($3 \times$ moles citrate) plus malate ($2 \times$ moles malate). A preferred calcium citrate malate has a calcium:citrate:malate molar composition of about 6:2:3 and 4:2:1.

The calcium citrate malate used in the methods of this invention can be provided as a solid or liquid solution. Methods for making calcium citrate malate are described in the following documents: Japanese Patent Specification SHO 56-97248, Kawai, published Aug. 5, 1981; and in U.S. 4,722,847 issued to Heckert (1988).

Calcium carbonate can be used as the calcium source. Other sources include calcium oxide and calcium hydroxide. Calcium chloride, calcium phosphate and calcium sulphate are not suitable for use herein since the anions make an acid solution, i.e. hydrochloric acid, sulfuric and phosphoric acid, respectively, which adversely affects the flavor of the calcium citrate malate.

Calcium citrate malate can be made, for example, by first dissolving citric acid and malic acid, in the desired molar ratio, in water. Calcium carbonate is then added to the solution, in such amount that the ratio of moles calcium to moles citrate and moles malate is as desired. Carbon dioxide will be evolved during the mixing.

A solid forms during the mixing of the calcium carbonate, calcium oxide or calcium hydroxide with the citric and malic acid. When these materials are used, it is necessary to mix until all of the calcium appears to have dissolved. The calcium citrate malate ligand will precipitate when its solubility is exceeded.

The preferred method of preparation is to make a highly concentrated solution of the calcium citrate malate which quickly and efficiently forces metastable calcium citrate malate out of solution. Concentrations of from 20% to 75% are preferred. Preferably the concentration is from 40% to 65%.

The reaction temperature can be ambient (2° C.) or higher. Preferably the temperature of the reaction is in the range of 30° C. to 80° C. Most preferably it is from 4° C. to 60° C.

This total mixture, which contains a supernatant liquid as well as a solid, can be dried. The solid can also be separated from the supernatant solution by filtration, centrifugation, or decantation and then dried.

Drying can be done by forced air drying, convection drying, oven drying, freeze drying or spray drying. No matter what form of drying is used, the temperature of the drying should be less than 100° C. Above 100° C., the calcium citrate malate decomposes. When it decomposes, a less soluble mixture is made and the ratio of calcium to citric and malic acid is changed.

Preferably, when using forced air drying, the drying is accomplished on a thin layer of product at between 60° C. and 85° C. The product is layered to between 0.05 inches and 0.5 inches thick.

In spray drying, the solution and solid mixture is sprayed into a hot air column at 60° C. to 85° C. The pressure in the column is 600 to 900 millimeters of mercury.

Vibratory freeze drying, or other conventional freeze drying techniques can also be used. The mixture is placed on a tray at a thickness of from about 0.01 to about 1 inch and frozen. A vacuum of 0.01 to 1 millimeters of mercury is used and a temperature of less than 25° C. is maintained during the freeze drying operation. The material is dried until the amount of free or unbound water is less than 5%.

When forced air drying or freeze drying is used, the dried material is ground using any conventional grinding equipment and then sieved to a particle size of less than 1 millimeter. This particle size makes it easier to dissolve. Grinding and sieving should be done under anhydrous conditions or at low humidities to keep the metastable calcium citrate malate from rehydrating.

The ratio of calcium to citric acid to malic acid will depend upon the reactants used and whether the entire preparation, including the supernatant liquid, is dried. In making calcium salts of the type 6:2:3, 6:2:5 and 6:3:4, it is important to include the supernatant in the material to be dried since lower ratio salts could drop out of solution. The exact formula for the salts can be derived by measuring the percent of calcium, and the percentage of citric and malic acid in the solid material. It is important to remember that water content also has to be analyzed since these materials readily form hydrate salts.

The calcium citrate malate represents a soluble form of calcium, which is considerably more soluble than calcium citrate, calcium malate, or calcium carbonate. In addition, this calcium citrate malate is considerably more soluble in dilute acid solutions.

Flavor Component

The flavor component of the beverages contains flavors selected from natural flavors, botanical flavors and mixtures thereof. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources. Fruit juice is also a fruit flavor as the term is used herein.

The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, Vanilla, coffee, kola, tea, and the like. Botanical flavors can be derived from natural sources such as essential oils and extracts, or can be synthetically prepared.

The particular amount of the flavor component effective for imparting flavor characteristics to the supplements and food or beverage mixes of the present invention ("flavor enhancing") can depend upon the flavor(s) selected, the flavor impression desired, and the form of the flavor component. The flavor component can comprise at least 0.002% by weight of the beverage composition and preferably from 0.05% to about 10% for most flavors. When a juice is used as the flavorant, the amount will be from about 5% to about 99.5% depending on the beverage. The amount of flavor added to the beverage is within the skill of one in the art and depends on the flavor intensity desired.

The preferred fruit or other botanical flavors, include vanilla, strawberry, cherry, pineapple, banana, lemon, orange, grapefruit, pear, apple, grape, cranberry, raspberry, blueberry, kiwi, peach, plum, lime, tangerine, passion fruit, coconut, blackberry and mixtures thereof.

The beverage can be a single strength juice product. n this case, the flavor, sweetener and water are all delivered in one entity. Such a beverage contains 99.85% juice, the remainder being calcium and citric and malic acids.

Sweetener Component

The sweetener composition is usually a monosaccharide or a disaccharide. These include sucrose, fructose, dextrose, maltose and lactose. Other carbohydrates can be used if less sweetness is desired. Mixtures of these sugars can be used.

In addition to sugar, the present invention can contain other natural or artificial sweeteners. Other suitable sweeteners include saccharin, cyclamates, acetosulfam, L-aspartyl-L-phenylalanine lower alkyl ester sweeteners (e g. aspartame), L-aspartyl-D-alanine amides (U.S. Pat. No. 4,411,925 to Brennan et al., 1983), L-aspartyl-D-serine amides (U.S. Pat. No. 4,399,163 to Brennan et al., 1983), L-aspartyl-L-1-hydroxymethyl- alkaneamide sweeteners (U.S. Pat. No. 4,338,346 to Brand, 1982), L-aspartyl-1-hydroxyz ethylalkaneamide sweeteners (U.S. Pat. No. 4,423,029 to Rizzi, 1983), L-aspartyl-D-phenylglycine ester and amide sweeteners (European Patent Application 168,112 to J. M. Janusz, published Jan. 15, 1986), and the like. A particularly preferred sweetener is aspartame.

The amount of the sweetener effective in the beverages, or mixes depends upon the particular sweetener used and the sweetness intensity desired. For noncaloric sweeteners, this amount varies depending upon the sweetness intensity of the particular sweetener. For sugar (i.e., sucrose), this amount can be from 5% to 85%. Typically from 40% to 70% by weight is used for nectars or concentrates and 10% to 15% for single strength products. In determining the amount of sugar, any sugar or other sweetener present in the flavor component is also included. Low-calorie sweetener combinations containing a noncaloric sweetener such as aspartame and a sugar, such as corn syrup solids, or sugar alcohols can also be used in beverage mixes. In general, the amount of artificial sweetener will be from about 0.5% to about 5%.

Other Ingredients

Other minor ingredients are frequently included in beverages. Such ingredients include preservatives such as benzoic acid and salts thereof, sulfur dioxide, butylated hydroxyanisole, butylated hydroxytoluene, etc. Also, typically included are colors derived either from natural sources or synthetically prepared.

Salt, e.g. sodium chloride, and other flavor enhancers can be used to improve the flavor of the beverage. Acids can also be used to modify the beverage flavor and pH. These include phosphoric acid, acetic acid, citric acid, ascorbic acid, tartaric acid, and other edible acids.

Emulsifiers can also be included. Any food grade emulsifier can be used. Lecithin is a preferred emulsifier. Other edible emulsifiers include mono- and diglycerides of long chain fatty acids, preferably saturated fatty acids, and most preferably, stearic and palmitic acid mono- and diglycerides. Propylene glycol esters are also useful in beverage mixes.

Solid beverages include mixes in the form of tablets, granules and bulk powders. These dry forms may contain suitable bulking agents or diluents, disintegrating agents, coloring agents, flavoring agents and flow-inducing agents.

The solid beverage mixes can contain effervescent granules or additives such as carbonate and acids which will cause the beverage prepared by the addition of water to be slightly carbonated.

The liquid beverages can be carbonated by adding from about 10% to 90% of the volume as carbonated water.

The beverages are prepared by conventional means. The calcium citrate is added with the other ingredients. U.S. Pat. No. 4,551,342, U.S. Pat. No. 4,737,378 and U.S. Pat. No. 4,722,847 describe methods of making these beverages.

Method of Preventing Tooth Erosion

Specifically, the present invention provides a method for preventing the erosion of enamel from the teeth of a human or animal subject and comprises administering a safe and effective amount of calcium citrate malate in the acidic beverage. From about 0.2% to about 0.15% (w/v) calcium is added as calcium citrate malate.

The following example illustrates compositions of the type provided by the practice of this invention, but is not intended to be limiting thereof.

EXAMPLE I

Calcium Citrate Malate is prepared by the following method:

| Materials | Amount (g) |
|---|---|
| Calcium Carbonate (99+% purity) | 200 |
| Citric Acid (Anhydrous, powder) | 192 |
| Malic Acid (DL, practical) | 201 |
| Distilled/Deionized Water | 1000 |

Procedure

To prepare about 500 grams of CCM (4:2:3) powder: Dissolve 192 g of citric acid and 201 g of malic acid in 1000 ml of distilled-deionized water in a 2 liter glass beaker and stir with a teflon coated magnetic stir bar until solution is clear (about 5 minutes). Carefully add 200 g of $CaCO_3$ to the acids solution at ambient temperature. This solid is added quickly, but at a rate slow enough to control the carbon dioxide evolution and to avoid overflowing the beaker. The mixture is stirred for 3 hours at room temperature. After 3 hours, the mixture is transferred in total to a 12 inch by 16 inch stainless steel tray to yield a solution fill level of approximately 0.5 −0.75 inch and is freeze dried.

After freeze drying, store the calcium citrate malate solid in a cool, dry place to avoid increasing the level of hydration. The calcium level of the product is 14.84% for the octahydrate form.

1.35, 2.69, 4.04, 5.39 or 6.74 gms/L of this calcium citrate malate is added to a carbonated soft drink. A synthetic dental enamel-like disc composed of ceramic (sintered) hydroxyapatite is immersed for 16 hours in 100 ml of the beverages in a rotary shaker and enamel erosion is measured gravimetrically by determining the pre and post immersion weight of the discs. The soft drink without added calcium citrate malate is used as a control. Enamel erosion (% weight loss) for the control sample was 8.25% whereas for the samples containing 1.35, 2.69, 4.04, 5.39 or 6.74 gms of calcium citrate malate the percent weight loss is greatly reduced to 0.75%, 0.20%, 0.07%, 0.06% and 05%, respectively.

EXAMPLE II

Calcium citrate malate is added to a soft drink by direct addition of citric acid, malic acid and calcium carbonate all at 1.0 g/L. This beverage was fed to rats (n=10) as the sole source of fluid for 21 days. A second group of rats (n=10) received the soft drink without calcium citrate malate and a third group (n=10) received water. At the end of the test period enamel erosion was measured by grading the lingual surfaces of the rat's mandibular molars. The erosion grading scale ranged from 0 (no effect) to 6 (nearly complete destruction of enamel with marked exposure of dentin and some destruction of dentin). The erosion grade (mean ± SD) for the plain soft drink was 4.29 ± 0.85 whereas the water group and soft drink plus calcium citrate malate had grades of 0.95 ± 0.38 and 0.71 ± 0.55, respectively. An erosion grade of 1 indicates a high polish of the lingual enamel. An erosion grade of 4 to 5 corresponds to moderate to severe enamel destruction with definite to appreciable exposure of dentin. The calcium fortified beverages showed little or no erosion of the tooth enamel.

EXAMPLE III

Human enamel specimens are obtained from extracted incisor teeth and mounted on rods. Surface hardness of the enamel is determined by the Vickers hardness measurement. The specimens are randomly divided into 5 groups (n= 8/group) balanced on the basis of surface hardness. The enamel specimens were immersed for 60 minutes into 15 ml of water, orange juice, grapefruit juice, orange juice with calcium citrate malate, or grapefruit juice with calcium citrate malate. The calcium content of the supplemented orange and grapefruit juice was about 1.25 gm/L and these samples were prepared according to the method described in U.S. Pat. No. 4,722,847 (Heckert). Following the immersion period, surface hardness was measured and compared with the pre-immersion hardness. A negative change in enamel hardness indicates the extent of erosion. Mean ± SEM decrease in hardness (e.g. change in Vickers units) for orange and grapefruit juice was −101 ± 8.7 and −130.4 ± 12.7, respectively. There was essentially no change in hardness for the water control group, −0.4 ± 4.3; orange juice with calcium citrate malate, 0.9 ± 5.8; and grapefruit juice with calcium citrate malate, 2.8 ± 6.4.

EXAMPLE IV

A variety of acidic beverages, some containing calcium citrate malate and some without, were assessed for enamel erosion using both in vitro and in vivo assays. For the in vitro test, the dissolution of synthetic dental enamel was used as a measure of enamel erosion as in Example I. For the in vivo assay for enamel erosion, rats (n=10/group) were fed the beverages during a 3 week period. The beverages were supplied as the sole source of fluid for 4 days each week and water was given for the remaining 3 days of each week. Enamel erosion was measured by grading the lingual surfaces of the rats mandibular molars as in Example II.

| Tested Beverage | Results | |
|---|---|---|
| | In Vivo Erosion Grade (mean + SD) | % Enamel Loss in Vitro |
| Punica Apple Plus Calcium Citrate Malate | 0.35 ± 0.4 | 0.10 |
| Punica Orange Plus Calcium Citrate Malate | 0.42 ± 0.37 | 0.17 |
| Valensina Orange Plus Calcium Citrate Malate | 0.50 ± 0.26 | 0.13 |
| Orange Crush Soft Drink | 3.60 ± 0.66 | 8.55 |

-continued

| Tested Beverage | Results | |
|---|---|---|
| | In Vivo Erosion Grade (mean + SD) | % Enamel Loss in Vitro |
| Fanta Soft Drink | 4.78 ± 0.61 | 15.55 |
| Fanta Diet Soft Drink | 5.38 ± 0.46 | 19.79 |
| Punica 17 + 4 | 4.95 ± 0.10 | 10.21 |
| Punica Orange Nektar | 4.70 ± 0.55 | 10.34 |
| Valensina Orange Nektar | 4.68 ± 0.37 | 9.13 |
| Valensina Apple Juice | 4.92 ± 0.54 | 10.36 |
| Capri-Sonne | 3.98 ± 1.04 | 6.70 |
| Hohes C | 4.48 ± 0.49 | 2.65 |

In vivo erosion grade scale ranges from 0 (no effect) to 6 (nearly complete destruction of enamel).

What is claimed is:

1. A method for preventing the erosion of tooth enamel in an animal or a human subject consuming acidic beverages comprising administering to said subject a safe and effective amount of a beverage having a pH below 5.5 comprising:
   (a) from about 0.02 to 0.15% calcium (w/v) in the form of calcium citrate malate;
   (b) from 0% to 85% sweetener;
   (c) at least 0.002% flavor; and
   (d) water.

2. A method according to claim 1, wherein said calcium citrate malate has a molar ratio of citrate:malate of from about 1:0.5 to about 1:4.5.

3. A method according to claim 2, wherein the calcium citrate malate is selected from the group of calcium citrate malate wherein the equivalents of calcium are equal to the equivalents of citrate plus malate and calcium citrate malate with a 4:2:3 molar ratio.

4. A method according to claim 3 wherein said beverage contains from about 5% to 99.5% juice.

5. A method according to claim 4 wherein said juice is selected from the group consisting of citrus juice, apple juice, pear juice, cranberry juice, peach juice, plum juice, lemon juice and mixtures thereof.

6. A method according to claim 3 wherein said beverage contains from about 0.002% to about 10% flavor.

7. A method according to claim 6 wherein said flavor is a juice selected from the group consisting of orange juice, lemon juice, lime juice, grapefruit juice, apple juice, plum juice, peach juice and mixtures thereof.

8. A method according to claim 7 wherein said juice is orange juice.

9. A method according to claim 8 wherein said flavor is orange essence and essence oil.

10. A method according to claim 1 wherein said beverage is a concentrate comprising:
   (a) from about 8% to about 98% juice having a concentration of from 35° to 80° Brix; and
   (c) from 0.1% to 5% flavor.

11. A method according to claim 10 wherein said juice is selected from the group consisting of citrus juices, apple juice, pear Juice, cranberry juice and mixtures thereof.

12. A method according to claim 11 wherein said juice is selected from the group consisting of orange Juice, lemon juice, grapefruit juice and mixtures thereof.

* * * * *